Dec. 5, 1967　　　　　A. C. PETERSON　　　　　3,356,591
METHOD AND APPARATUS FOR DISTILLATION OF MATERIALS
IN SOLUTION BY DIRECT AND INDIRECT
CONTACT WITH AIR
Filed April 17, 1961　　　　　　　　　　　　3 Sheets-Sheet 1

INVENTOR
ADOLPHE C. PETERSON

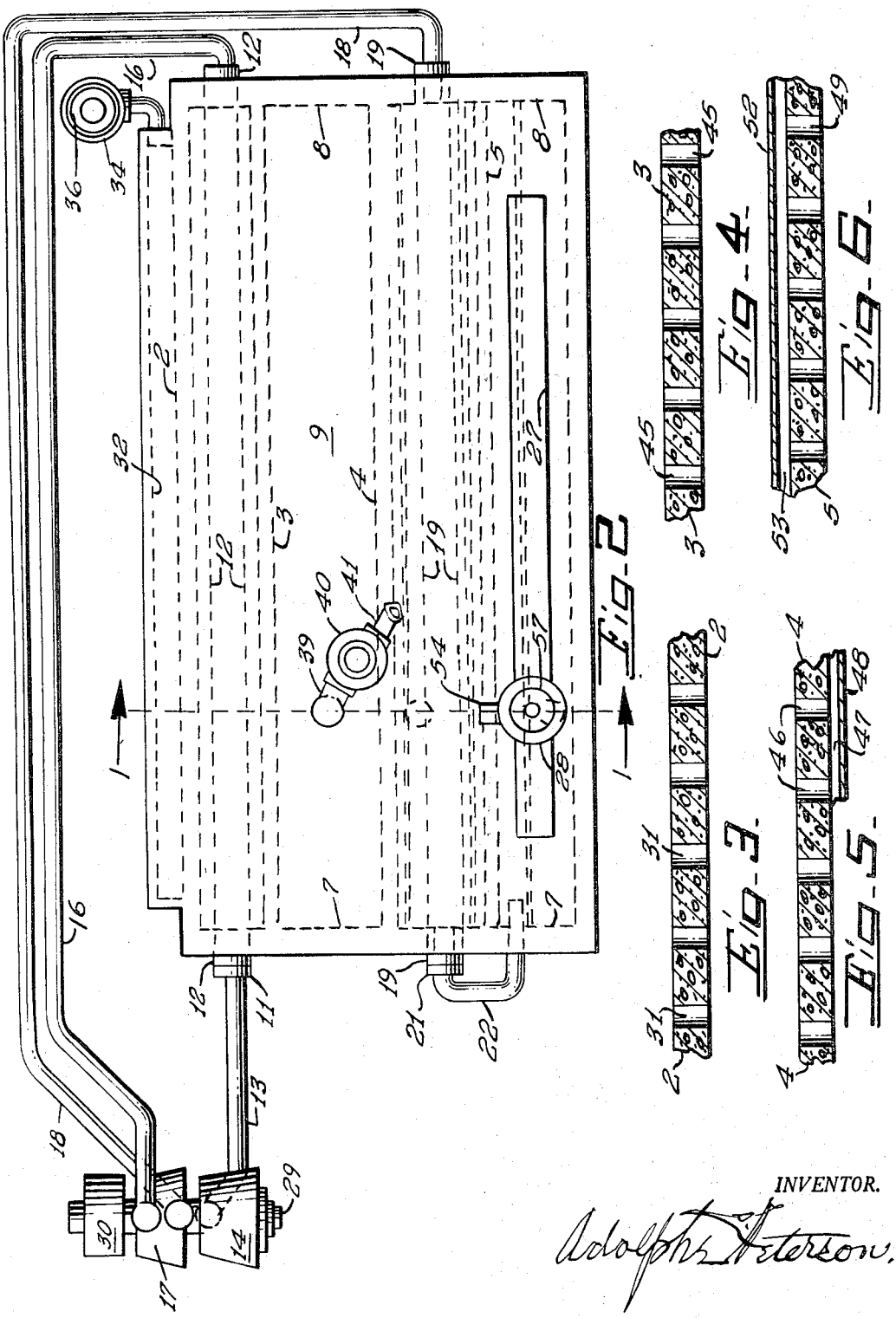

United States Patent Office 3,356,591
Patented Dec. 5, 1967

3,356,591
METHOD AND APPARATUS FOR DISTILLATION OF MATERIALS IN SOLUTION BY DIRECT AND INDIRECT CONTACT WITH AIR
Adolphe C. Peterson, 4623 Bruce Ave. S., Minneapolis, Edina, Minn. 55424
Filed Apr. 17, 1961, Ser. No. 103,598
12 Claims. (Cl. 203—10)

My invention relates chiefly to separation of essential ingredients of a very abundant material into desired forms of the materials composing the very abundant material and the invention is called method and apparatus for distillation of materials in solution by direct and indirect contact with air.

The primary object of my invention is to provide a means which shall be enabled, because of its component elements and units and the manner of their use, to separate the very much desired fresh water or salt-free water from the very abundant sea-water of the ocean, where the water is of such character that it is not available either for human beings or animals or crops or vegetables, in growing, for their continued sustentation and development. The water of the ocean is in general available in locations relatively near to those lands of the earth which are generally arid or dry or desert in character as all of such types of lands are generally at or very near or relatively near the equator, such as lands in the southern or western portions or southwestern portions of the United States, and such as are in the northern parts of the African continent. Such lands generally could be very fertile, if water was available in sufficient quantity as salt-free water. Like-wise the water of the ocean is sometimes very near the large cities of the United States and other countries, which cities must procure fresh water from distant locations by means of canals or conduits which are constructed at a very high cost and are therefore almost prohibitive in construction cost. It is the object especially to provide such a means for procurement of salt-free water from such ocean water by a means which in cost shall be within the means and ability of regions and cities which might be served by such a means. The object is the provision of a means, for the purposes stated, which means shall utilize a relatively simple means for the accomplishment of the objective, and which means shall utilize a system which inherently provides a large portion if not all as in some cases, of the heat and power requirements for the operation, and which shall therefore be comparatively a low cost or cost-less system for such provision, in so far as operation or maintenance cost is concerned.

It is further an object to provide such a system or plant which is so designed that initial construction or capital costs are substantially lower than as otherwise might be the cost involved. It is further an object to provide such a means of accomplishment of the objective as will involve less material of costly nature in its construction and also less labor in the construction of a plant for the purpose. While it is contemplated that the chief use of the system and devices will be for release or recovery of salt-free water from sea-water, it is intended that the apparatus and method is adaptable to similar use with other materials especially water containing materials.

The principal devices and combinations of devices comprising my invention are as hereinafter described and as further defined in the claims. In the accompanying drawings which illustrate my invention, like characters refer to like parts throughout the views in so far as practicable. Referring to the drawings:

FIGURE 1 is a view chiefly in vertical cross section transversely of the chief units of the device and is on line 1—1 of FIGURE 2, some parts or units being shown in full side elevation, some parts broken away.

FIGURE 2 is a plan view which is necessarily largely diagrammatic in character because of the considerable number of devices included, this view being on a scale which is approximately one-half that of FIGURE 1, this view showing connections of units as may be shown in plan view, some connections being somewhat differently located than as in FIGURE 1 for better comprehension of the device, although the functions being similar and resulting in similar operation.

FIGURES 3, 4, 5, 6 are detail sections on lines 3—3, 4—4, 5—5, 6—6 of FIGURE 1.

Figure 1:
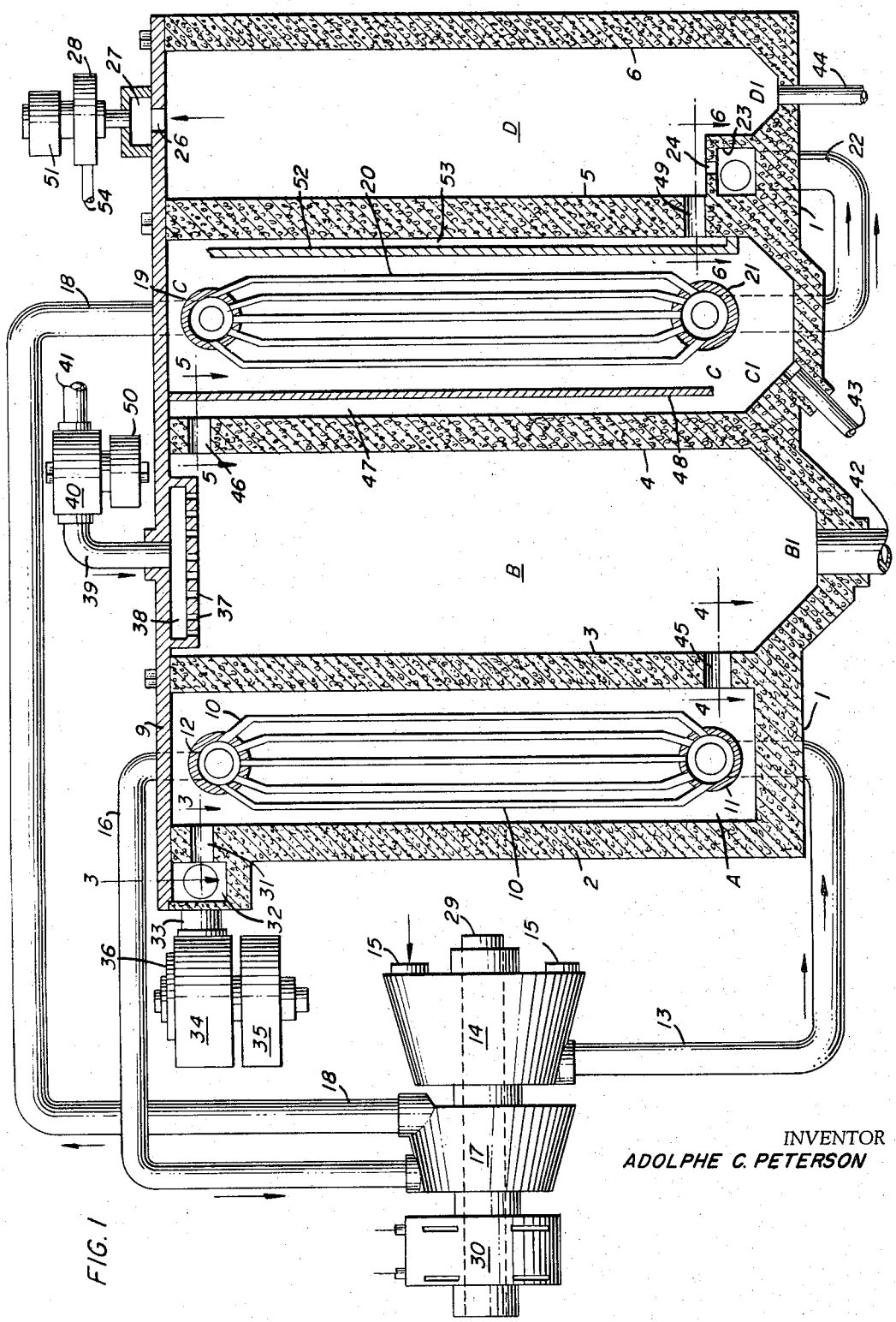

The plant for the purpose indicated and according to my design involves four chambers as illustrated in FIGURE 1, and these chambers are designated in order beginning at the leftward end, the air-heating chamber A, the prime materials chamber or sea-water absorption and heating chamber B, the vapor condensing chamber C, and the associated vapor condensing chamber D, the latter being for supplemental condensation after condensation is chiefly performed in chamber C. The chambers designated are formed over a concrete or other base which is generally designated 1 and are formed to be parallel each to the others and each relatively high and long in proportion to width and to be between and separated individually each from the others by concrete or other walls designated 2, 3, 4, 5, and 6. This concrete or other structure 1, 2, 3, 4, 5, 6 forms vertically deep chambers which are closed at their ends horizontally by the end walls 7 and 8 the latter being formed to be transversely of the ends of all the chambers and to substantially close all the chambers at their ends horizontally. The concrete structure is not closed by concrete means at the tops of the chambers but is closed as to all such chambers A, B, C, D by a cover plate or plates 9, this structure being preferably formed of metal such as steel, iron, aluminum or magnesium or by some material of adequate strength and corrosion resistance such as some form of plastic material or it may be some form of ceramic material. It is contemplated that the interior and other surfaces of the concrete material forming the structure may be coated with some form of plastic material or ceramic material or metal such as aluminum which will resist corrosion and especially will resist salt-containing sea-water. The structure and chambers indicated will in any plant be as large in each dimension as is necessary in any plant it being understood especially that a plant may consist of as many such plants as is described as will be necessary and as will be most economically constructed.

The air heating chamber A has mounted in it by any means such as is desirable the heat exchanger or tubes 10, such tubes 10 being secured between and conductive between drums 11 and 12. The drums 11 and 12 are of such length that the ends of each are supported in the end walls 7 and 8 as is shown in FIGURE 2. The drum 11 is connected by the conduit 13 with the high pressure end of an axial flow air compressor 14 which receives atmospheric or ambient air for compression by means of the air entrances 15. The drum 12 receives the high compression air from the tubes 10 and delivers the high compression air still under relatively high compression through the conduit 16 to the high pressure end of an axial flow turbine 17 through which the high pressure air flows and is expanded and thereby cooled.

The air which has been expanded in the turbine 17 and is then at relatively low pressure flows from the turbine 17 through the air conduit 18 to a drum 19 which is located in the upper end of the vapor condensing chamber C, and the expanded and cooled air flows by means of the drum 19 through the tubes 20 to the drum 21 which is located in the lower end of the chamber C, the vapor condensing chamber, the tubes 20 being extended vertically within the chamber C. The cooled expanded air flows by way of drum 21 to the conduit 22 and thereby to a long conduit 23 which is formed in the concrete of the lower wall 5 and base 1 (or otherwise formed) and the air is emitted therefrom through a plural number of apertures 24 which are formed in the conduit wall 25, the apertures 24 opening to the space within the chamber D also a vapor condensing chamber. Air which has thus been delivered from the conduit 23 and apertures 24 flows upwardly in chamber D and at the upper end of the chamber D flows for expulsion through the plural number of apertures 26. Apertures 26 deliver the air into a conduit 27 which in turn delivers to the radial type centrifugal blower or compressor 28 whereby the air from apertures 26 is under suction from the compressor 28 so that thereby also the air and fluid in chamber D may be under light suction.

The air compressor 14 is driven by the shaft 29 which is also the shaft of the electric motor 30 and the turbine 17 so that the air compressor 14 may be driven by either the electric motor 30 or the turbine 17 or both according to the need and the exertion of driving power by the turbine 17. In operation the air compressor 14 will be in considerable part given driving power or work energy by the turbine 17 since the turbine 17 is at all times in the normal operation subjected to a pressure flow of air which is not but slightly less than the pressure flow of air from the air compressor 14, and therefore the electric motor 30 will in operation be required to furnish only a part of the driving power and such requirement will depend to a considerable extent on the conditions of operation and proportioning of parts such as the compressor, the turbine, and the connecting conduits. Such proportioning should be such as will procure the most efficient operation with the least necessity for supply of driving power by the electric motor 30. In normal operation of the apparatus, the compressed air flowing from compressor 14 through heat dispersal conduit means 10 will lose some heat and pressure and the remaining energy in the compressed air flow, flowing through turbine 17, will normally be somewhat less than the energy which would be needed to drive shaft 29 for compression of the inducted air in compressor 14, so there will be some need for supply of additional driving power to shaft 29 and that additional driving power will be provided by the electric motor 30. Such control means as are usually used with electric motor means, or any such control means may be provided, as necessary for any particular construction.

The air chamber A will receive air under merely that pressure which will ensure adequate and even flow of air by way of air ports or apertures 31 from the conduit 32 which is parallel to the length of chamber A, and the conduit 32 will receive the air by way of conduit 33 from the air blower or compressor designated 34, the latter being driven by the electric motor 35. The blower 34 receives atmospheric or ambient air from the air entry port 36 (formed annularly of the axis of the blower 34 in its casing) and that may receive the air directly from ambient air or from any means such as any solar irradiated light translucent conveyor such auxiliary means being not shown, since it is contemplated that the air may be inducted directly from ambient atmosphere since the device will generally or largely be used in latitudes where ambient air is relatively warm.

The chamber B at its upper end, throughout its length receives a light or adequate spray, from the large number of spray apertures or nozzles 37 and these receive liquid with a contained or therein dissolved material from the broad and long relatively thin conduit 38 which in turn receives the liquid and material from the conduit 39 to which the liquid and material is delivered, under that pressure which is determined to be best for adequate spraying of the material and liquid, by means of the pump 40 when that pump draws the liquid and material by way of conduit 41 from any source of supply of the material and liquid which may be the water of the ocean or any ocean or bay thereof, or it may be any reservoir to which such liquid and material is delivered by other pumps for preliminary solar heating and a reservoir of supply, or it may receive the material and liquid from any source of such liquid and material which may be that for which the device or plant is designed. The device is primarily designed for use with sea-water as the source of liquid and material but the device may be used for other materials for which it may be adapted for use.

The chamber B at its bottom has a trough-like part $B^1$ and from this concentrated brine or other contained material may be withdrawn by means of the conduit 42 or any number of such conduits. The chamber C at its bottom has a trough-like part $C^1$ to which distilled liquid such as is condensed will flow or drop and this may be withdrawn therefrom by the conduit 43. The chamber D likewise has at its bottom the trough-like part $D^1$ and any distilled water or liquid may flow or drop thereto and be withdrawn by conduit 44.

The wall 3 has a plural number of air ports 45 which are placed in a horizontal line near the lower end of the wall and which pass air from the lower end of the chamber A to the lower end of the chamber B from which the air rises in chamber B. The wall 4 near its top has a plural number of air and vapor ports 46 which are in line horizontally and which pass air and vapor from the upper end of chamber B to a space 47 at the upper end thereof and this space lies between the wall 4 and a thin curtain wall 48 (of metal or otherwise) and will conduct the air and such vapor as there is downwardly to the lower end of the curtain wall 48 where the air (and vapor) will pass under the lower end of the wall 48 to the lower end of the space in the chamber C where the air will rise upwardly.

The pump 40 is actuated by the electric motor 50. The air blower 28 is actuated by the electric motor 51. The air which enters the lower end of chamber C from space 47 after rising upwardly in chamber C will flow over the upper end of the curtain wall 52 and flow downwardly between curtain wall 52 and the wall 5 until the air reaches the ports 49 through which it will flow to the lower end of chamber D and it will then rise therein.

Having described in detail the elements and units which comprise the apparatus, there is now more generally described the use and operation of the plant as in the following. The electric motors 35, 30, 50, and 51 are actuated by any control means as is generally provided for such motors put in operation. The blower or air compressor 34 will then draw air from ambient air (or otherwise as stated) and pass the air to chamber A where the air flows downwardly and flows through ports 45 to the lower end of chamber B where the air rises upwardly to ports 46 and flows therethrough to space 47, and from the latter space the air flows to the lower end of chamber C where the air again rises and flows to the upper end of space 53 and therefrom the air flows downwardly in space 53 to ports 49 and through ports 49 to the lower end of space or chamber D, and in said lower end the air rises upwardly to ports 26 to conduit or channel 27 from which air is drawn at a low pressure by air blower 28 and delivered by exhaust pipe 54 to ambient air. As such air flow is initiated and continued, the pump 40 pumps the material and liquid supply (from any source as described) and delivers it to the thin conduit 38 and from thence through the spray ports or nozzles 37 and as the supply is there sprayed it enters the air at the upward end of chamber B and falls in a generally finely sprayed liquid and material downwardly through the hot air rising in chamber B so that such hot air converts a major part of the contained liquid (as water) in the material supply to vapor and the vapor is drawn with the air through ports 46 to the chamber C at the latter's bottom.

As the air borne vapor flows into the lower end of the chamber C and rises therein it is subjected to cold as later described and a major part of the carried vapor is condensed to water which water drops to the lower end of the chamber C and collects in trough C¹ and may be withdrawn by the pipe or pipes 43. The air with such remaining vapor carried thereby flows into chamber D at the lower end thereof and rises where it meets with and mixes with cold air coming from pipe 22 and the mixture of air borne vapor and cold air rises and this results in further condensation of such remaining vapor as there is then in the rising air which has come from the chamber C.

As the flow as is above described continues, the electric motor 30 causes the air compressor 14 to be driven and this compressor then draws air from ambient air and compresses this air to a pressure which may be say any pre-determined or desired pressure as say thirty pounds above atmospheric air pressure or any pressure which is economically feasible in efficient operation of the plant and this may be any greater pressure up to as much as one hundred pounds or even more, according to the type and efficiency of the air compressor 14 and the design of the plant in the entirety.

The air compressed by compressor 14 flows to drum 11 by conduit 13 and flows through pipes 10 where the heat of the compressed air, which is say something over 212 degrees Fahrenheit to any feasible operating temperature even as much as four to five hundred degrees Fahrenheit, is transferred through the walls of pipes 10 to the air flowing through chamber A so that this flowing air acquires a temperature of something over 212 degrees Fahrenheit and as such the flowing air enters chamber B to mix with sprayed liquid and material in chamber B to vaporize water or the carried liquid.

The compressed air in pipes 10 while losing heat will flow at a pressure which is not more than a few pounds per square inch less than the pressure at which the air flows from compressor 14 so that the pressure may still be near thirty pounds or even considerably more than this depending on the initial pressure from compressor 14. The differential need not be and is preferably so determined by the construction that it is no more than two or three to five pounds. Thus the air will leave tubes 10 at about near thirty pounds to any predetermined pressure higher than that and the air under such pressure will flow through pipe 16 to turbine 17 through which the air under pressure will flow and produce working energy in the turbine 17 and drive the shaft 29 thereby. The air flowing through turbine 17 will be, by the expenditure of work energy, reduced in pressure and temperature to a pressure which may be approximately that of ambient air and which temperature may be a temperature which is considerably below 212 degrees Fahrenheit and may be as low as say freezing temperature of 32 degrees Fahrenheit or near that temperature. The air as so cooled flows then through pipe 18 to drum 19 and through pipes 20 and then through drum 21 to pipe 22 and thereby to chamber D. The cooled air from the compressor 14 and turbine 17 flowing upwardly and mixing with the air borne vapor as remains will cause condensation of all or some of the remaining vapor in the air received from chamber C.

By the process indicated it will be noted that the heat of compressed air (at relatively high temperature) heat low pressure air received from ambient air to a temperature high enough to vaporize all or a considerable part of water in the liquid and material sprayed into chamber B and this vapor is then carried to chamber C where the cooled expanded air from turbine 17 and in tubes 20 absorbs heat from the air borne vapor in chamber C and condenses vapor therefrom which falls as liquid (water or other liquid) to the bottom of chamber C and therefrom liquid may flow through pipe 43. The remaining vapor in the air passing to chamber D is cooled further by mixture with the expanded cooled air flowing to chamber D by pipe 22 and further condensation of remaining vapor ensues, with further production of liquid to be withdrawn through pipes 44.

It will be noted that in operation of the motor 30, turbine 17 and compressor 14, there is a very substantial recovery of energy in the turbine 17 for driving the compressor 14 and that therefore the electric motor will be so proportioned and it will have such control by its electric control means (such as may be provided) that only the necessary additional energy for driving the compressor 14 is provided by the electric motor 30. The turbine 17 should in all its features or component elements be so proportioned that it will utilize the energy of the compressed air at its residual pressure and temperature for production of the maximum proportion of driving energy on the shaft 29, thus effectually and substantially reducing the required proportion of electric energy required for the compression of the air in compressor 14.

I have included in the device the two chambers C and D for vapor condensation, but it is contemplated that either of the chambers C or D may be eliminated and the condensation may then be performed solely by the method utilized as to the one selected chamber C or D. If the method utilized in chamber D is solely to be utilized then the drums 19, 21 and tubes 20 may be eliminated and the expanded cooled air is then conveyed directly to chamber D from the turbine 17, so that then all the cooling ability of the expanded cooled air is utilized in chamber D for direct mixing with the airborne vapor and direct condensation of liquid without necessity for the heat transfer conduit means, preferably such heat transfer means is utilized although the simpler method is available where cost of the plant is an important factor.

Figure 7:
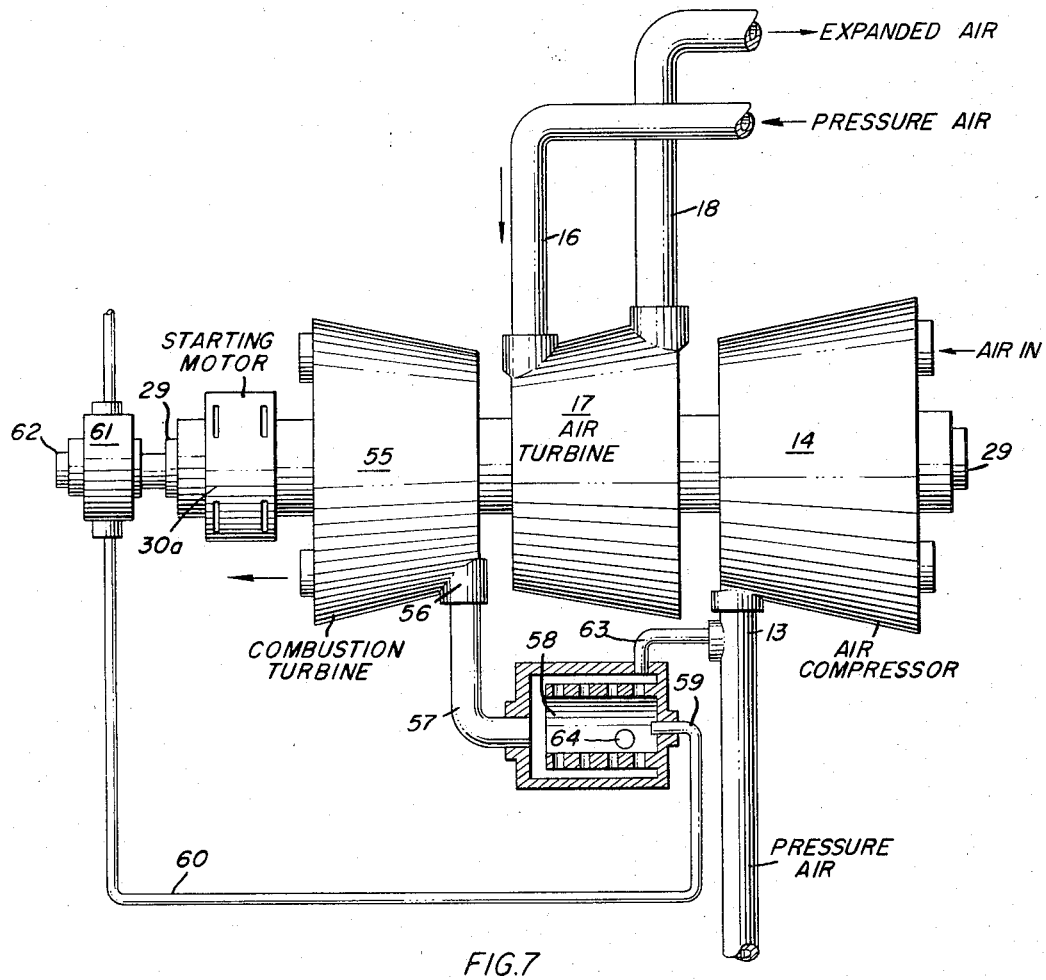
FIGURE 7 illustrates in part a modified form of the device.

Referring now to the modified form of my invention which is shown in part in FIGURE 7, this form is in all respects relating to the chambers A, B, C, D, and the drums 11, 12 and tubes 10, and the drums 19, 21 and tubes 20, and the air blowers 34 and 28 and their functions, and the material supply means 40, 41, and the water drainage or delivery means, substantially identical with the similarly numbered parts in FIGURES 1 and 2, and all such means perform similarly. This modified form differs in the means by which supplemental or primary power for driving is given to the shaft 29 which drives the air compressor 14. In the first form illustrated supplemental driving power is provided by the electric motor 30 in the extent which is necessary to maintain rotation of the shaft 29 and the rotary air compressor 14. The shaft 29 extends axially through the air compressor 14, the air turbine 17, the combustion turbine 55, the starting motor 30a, and such bearing means as is customarily used in such appliances is built into the various units or elements, so that the shaft 29 and the necessary rotating elements as in such apparatus, will be rotationally mounted thereby.

In this modified form the shaft 29 is provided with supplementary driving power (that is driving power in addition to that which is provided by turbine 17 (the air turbine)) by a combustion turbine of any type designated 55 and this combustion turbine at its inlet 56 and by pipe 57 receives combustion gases and air from the combustion chamber or means which is designated 58 and is of any type such as is commonly used with combustion turbines. The combustion chamber 58 receives fuel by means of nozzle 59 and pipe 60 from the fuel pump 61 which is driven by extension shaft 62, the latter being connected with shaft 29. The combustion chamber 58 receives air under pressure by pipe 63 from the air pressure delivery pipe 13 of the air compressor 14 (only the pipe 13 being shown in FIGURE 7). The air received in the combustion chamber is combusted with fuel from the nozzle 59 and combustion is initiated by spark plug 64 which receives current from any electric current source.

The electric motor 30a is in this case merely a starting motor for the combustion turbine and air compressor 14 and it may be arranged to cease operation when the combustion cycle is started in the combustion turbine 55.

In FIGURE 7 which does not show the chambers A, B, C, D of FIGURE 1, but which chambers and their accessories are to be incorporated also with this modified form, there are shown broken away pipes or conduits which elements are the same as similarly numbered parts in FIGURES 1 and 2 and which function similarly in connection with the chambers A, B, C, D of FIGURES 1 and 2, and in connection also with the heat transfer drums and their tubes 10 and 20.

This modified form in operation is different only in that the supplemental driving energy for the air compressor 14 is derived from the combustion turbine 55 instead of the electric motor 30a. The air compressor 14 supplies the major portion of its discharge of compressed air to the heat transfer unit tubes 10 and after expansion to tubes 20, but a small portion of the compressed air is discharged directly to the combustion chamber 58 and its gas discharge to the combustion turbine 55 and this is supplied with fuel by the fuel pump 61 so that work energy is thereby provided for the turbine 55. The proportions of compressed air supplied by compressor 14 to the heat transfer units and the combustion turbine 55 is such as is determined in any particular construction to be necessary, it being considered that a large part or a major part of driving power is furnished by the air expanding in air turbine 17 which air therein expanded is that passing by way of the heat transfer tubes 10 to the turbine 17.

There may be if it be desired in any construction, such utilization of heat of the exhaust gases from combustion turbine 55 as is possible or desirable by provision of additional heat of the exhaust gases to either of the air systems or flows, that is the low pressure inducted air or the air inducted for compression.

The chambers which have been designated A and B may for purpose of designation in the claims be referred to as "primary chamber means"; and the chambers which have been designated C and D may for purpose of designation in the claims be referred to as "secondary chamber means."

While I have shown particular devices and combinations of devices in the illustration of my invention, it is contemplated that other detailed devices and combinations of devices may be utilized in the realization of my invention without departing from the spirit and scope and contemplation thereof.

What I claim is:

1. In an apparatus for segregation of materials in solution of the character described: a heat dispersal conduit means a heat absorption conduit means; a primary low pressure conduit means for flow of a first stream of inducted air in indirect heat transfer association with said heat dispersal conduit means; a secondary low pressure air conduit means for flow of said first stream air in indirect heat transfer association with said heat absorption conduit means; an evaporative chamber to which the inducted air flows by connective means from said primary low pressure conduit means and from which said first stream inducted air flows by connective means to said secondary low pressure air conduit means; a means to supply solution for segregation to said evaporative chamber and for flow in direct contact with the inducted air flowing in said evaporative chamber from said primary low pressure evaporative conduit means; a means for compression of a second stream gaseous fluid to raise the temperature thereof and for passage of the compressed and temperature raised second stream gaseous fluid to said heat dispersal conduit means for transfer of heat therefrom to inducted air flowing in said primary low pressure conduit means; a means permitting and expanding restrictive flow of the second stream gaseous fluid from said heat dispersal conduit means to said heat absorption conduit means and for discharge of said second stream gaseous fluid from said heat absorption conduit means; and means driving said compression means the said means driving said compression means being comprised in combustion turbine receiving a proportion of air compressed by said compressing means and receiving fuel from a fuel supply means for combustion with air received by said combustion turbine in its combustion chamber and driving connection means between said combustion turbine and said compression means.

2. In an apparatus for segregation of materials in solution of the character described: a heat dispersal conduit means a heat absorption conduit means: a primary low pressure conduit means for flow of a first stream of inducted air in indirect heat transfer association with said heat dispersal conduit means; a secondary low pressure air conduit means for flow of in said first stream air indirect heat transfer association with said heat absorption conduit means; an evaporative chamber to which the inducted air flows by connective means from said primary low pressure conduit means and from which said first stream inducted air flows by connective means to said secondary low pressure air conduit means; a means to supply solution for segregation to said evaporative chamber and for flow in direct contact with the inducted air flowing in said evaporative chamber from said primary low pressure conduit means; a means for compression of a second stream gaseous fluid to raise the temperature thereof and for passage of the compressed and temperature raised second stream gaseous fluid to said heat dispersal conduit means for transfer of heat therefrom to inducted air flowing in said primary low pressure conduit means; a means permitting and expanding restrictive flow of the second stream gaseous of the fluid from heat dispersal conduit means to said heat absorption conduit means and for discharge of said second stream gaseous fluid from said heat absorption conduit means; and means driving said compression means, and a condensing chamber to which said second stream gaseous fluid is by connective means delivered and to which said low pressure air as issues from said secondary low pressure air conduit is by connective means delivered, all the gaseous fluid issuing from said secondary low pressure air conduit means and from said heat absorption conduit means being intermingled in said last named chamber to be in direct contact therein either with the other and means withdrawing condensed liquid such as accumulates in said condensing chamber.

3. In an apparatus for segregation of materials in solution of the character described: a heat dispersal conduit means; a heat absorption conduit means; a primary low pressure conduit means for flow of a first stream of inducted air in indirect heat transfer association with said heat dispersal conduit means; a secondary low pressure air conduit means for flow of said first stream in indirect heat transfer association with said heat absorption conduit means; an evaporative chamber to which the inducted first stream of air flows by connective means from said primary low pressure conduit means and from which said inducted air flows by connective means to said secondary low pressure air conduit means; a means to supply solution for segregation to said evaporative chamber and for flow in direct contact with the inducted air flowing in said evaporative chamber from said primary low pressure conduit means; a means for induction and compression of a second stream of air to raise the temperature thereof and for passage of the compressed and temperature raised second stream air to said heat dispersal conduit means for transfer of heat therefrom to the inducted first stream air flowing in said primary low pressure conduit means; a fluid expanding engine means to which said second stream air flows from said heat dispersal conduit means for expansion and driving of said fluid expanding engine and means for passage of said second stream air from said fluid expanding engine through said heat absorption conduit means and exhaust therefrom; the said fluid expanding engine having driving connection between it and said means for compression of said second stream air; and an auxiliary driving means contributing driving work energy to said means for compression.

4. The device as defined in claim 3 and: the said auxiliary driving means being comprised in a combustion turbine receiving a proportion of air compressed by said compressing means and receiving fuel for combustion therein and having an exhaust therefrom.

5. The device as defined in claim 3 and: a condensing chamber to which fluid from said heat absorbing conduit means is delivered and means withdrawing condensed liquid such as accumulates in said condensing chamber; the said secondary low pressure air conduit means having conductive connection with said condensing chamber to provide for flow of fluid thereto; the said condensing chamber having an outlet therefrom for flow of said inducted air therefrom.

6. The device as defined in claim 3 and: the said heat providing fluid flowing to said means for compression being inducted ambient air other than said inducted air flowing into said primary low pressure air conduit means.

7. In means of the character described: three chambers, one of which is for primary low pressure air, one of which is an evaporative chamber for flow thereto of solution for segregation, one of which is a condensation chamber for flow of air borne vapor thereto for condensation of the vapor; the said chambers being formed as elongated adjacent parallel chambers contained in a structure having end walls for the structure and having one vertical wall between the first named chamber and the second named chamber and having another vertical wall between the second named chamber and the third named chamber and having one vertical side wall at the outside side of the first named chamber and having one vertical side wall at the outside side of the last named chamber; the said chamber structure having a horizontal cover structure enclosing the upper ends of the said chambers; and a heat dispersal conduit means in said first named chamber; and a heat absorption conduit means in said last named chamber; means for flow of inducted ambient air to said first named chamber and therefrom to said second named chamber and from said second named chamber to said third named chamber; and means for compression of other inducted air and flow thereof to said heat dispersal conduit means; and means for flow of said other inducted ambient air from said heat dispersal conduit means and to said heat absorption conduit means and therefrom to a discharge; and means for restriction and expansion of the flow from said heat dispersal conduit means to said heat absorption conduit means to maintain pressure in said heat dispersal conduit means; and means for supply flow of solution for segregation to said evaporative chamber.

8. The method of recovery and segregation of a liquid from liquid bearing solution, comprising: the induction of primary air and movement thereof at low pressure through a primary air heating zone to a vapor absorbing zone and from the vapor absorbing zone to a condensing zone; the induction of heat providing air and compression thereof and movement of the compressed and temperature raised air in heat transfer relation with the inducted primary air in the primary air heating zone to transfer heat to the primary air, the conduction of the heat providing air after release of heat to the primary air to a turbine and expansion of the heat providing air therein and lowering of its temperature thereby to a lower temperature, the conduction of the temperature reduced heat providing air to the condensing zone in heat transfer relation with the vapor laden primary air in the condensation zone for condensation of the vapor; the introduction of the liquid bearing solution material to the vapor absorbing zone; and the recovery of the condensed liquid in the condensation zone.

9. In means of the character described: three chambers, one of which is for primary low pressure air, one of which is an evaporative chamber for flow thereto of solution for segregation, one of which is a condensation chamber for flow therein of air borne vapor for condensation of the vapor; a heat dispersal conduit means in said first named chamber; a heat absorption conduit means in said last named chamber; means for supply and flow of solution for segregation to said evaporative chamber; means for flow of a first stream of inducted air to said first named chamber and therefrom to said second named chamber and from said second named chamber to said third named chamber and discharge therefrom; means for induction and compression a second stream of inducted air and flow of such air as compressed to said heat dispersal conduit means and for flow thereof from said heat dispersal conduit means and to said heat absorption conduit means; means for restriction of flow from said heat dispersal conduit means to said heat absorption conduit means to maintain pressure in said heat dispersal conduit means; the last named means for restriction of flow including a turbine for passage of said second stream of air from said heat dispersal conduit means to said heat absorption conduit means, said turbine having driving connection with said means for compression.

10. In an apparatus for segregation of materials in solution of the character described; a heat dispersal conduit means; a heat absorption conduit means; a primary low pressure conduit means for flow of a first stream of inducted air in indirect heat transfer association with said heat dispersal conduit means; a secondary low pressure air conduit means for flow of the inducted air in indirect heat transfer association; an evaporative chamber to which the inducted air flows by connective means from said primary low pressure conduit means and from which the said inducted air flows by connective means to said secondary low pressure air conduit means; a means to supply solution for segregation to said evaporative chamber and flow in direct contact with the inducted air flowing in said evaporative chamber from said primary low pressure conduit means; a means for compression of a second stream of inducted air to raise the temperature thereof and for passage of the temperature raised second stream air to said heat dispersal conduit means for transfer of heat therefrom to the inducted air flowing in said primary low pressure conduit means; a fluid expanding engine means to which said second stream air flows from said heat dispersal conduit means for expansion and driving of said fluid expanding engine means; a means for flow of the expanded second stream air from said fluid expanding engine means to said heat absorption conduit means for flow in direct contact with inducted air and evaporated liquid carried therewith in said heat absorption conduit means; the said fluid expanding engine means having driving connection between it and said means for compression and an auxiliary driving means contributing work energy to said means for compression.

11. In an apparatus for segregation of materials in solution; a primary chamber means having means for flow thereinto of a first stream of air and means to produce flow thereinto of solution for segregation; a secondary chamber means and connective means for flow of airborne vapor from said primary chamber means and to the secondary chamber means; a means for induction of a second stream of air and compression thereof and passage of such heated compressed air to heat dispersal conduit means located within said primary chamber means; a turbine air expanding engine included in conductive means between said heat dispersal conduit means and heat absorption conduit means located within said secondary chamber means, the expanding engine receiving the air of the second stream after heat dispersal therefrom, the expanding engine after expansion of the air of the second stream discharging through the heat absorption means for absorption of heat from airborne vapor in said secondary chamber means; there being connective driving means from said expanding engine and to said means for compression; means for withdrawal of liquid as condensed in said secondary chamber means.

12. In means of the character described: two chambers, one of which is an evaporative chamber for flow of solution for segregation thereto, one of which is a condensation chamber for flow therein of air borne vapor for condensation therefrom; a heat dispersal conduit having heat transfer surface means exposed to fluids in said evaporation chamber; a heat absorption conduit means having heat transfer surface means exposed to fluids flowing in said condensation chamber; a means inducting primary air from atmosphere, delivering the primary air to said evaporation chamber, a first connective means by which air borne vapor is passed from the evaporation chamber to the condensation chamber, and a discharge of primary air from the condensation chamber; a means inducting and compressing secondary air from atmosphere and delivering the secondary air as heated by compression to the heat dispersal conduit; a second connective means by which the secondary air is delivered from the heat dispersal conduit to an air expanding turbine; a third connective means by which the secondary air is delivered from the turbine after expansion thereby to the heat absorption conduit means and therethrough and to a discharge to ambient air; means by which the turbine contributes work energy to the means inducting and compressing air; means withdrawing condensation formed in the condensation chamber; means supplying solution for segregation to the evaporation chamber.

References Cited

UNITED STATES PATENTS

| | | | |
|---|---|---|---|
| 1,867,076 | 7/1932 | Hughes et al. | 62—58 |
| 2,398,068 | 4/1946 | Worthen et al. | 62—58 |
| 1,466,670 | 9/1923 | Monti | 203—100 |
| 2,184,845 | 12/1939 | Noack | 110—106 |
| 2,368,665 | 2/1945 | Kohman et al. | 203—10 |
| 2,515,013 | 7/1950 | Kruhmin | 203—100 |
| 1,493,756 | 5/1924 | La Bour | 203—90 |
| 2,018,049 | 10/1935 | Allen | 203—14 |
| 2,372,846 | 4/1945 | Nettel et al. | 203—77 |
| 2,803,591 | 8/1957 | Coanda | 202—234 |

FOREIGN PATENTS

| | | |
|---|---|---|
| 102,539 | 9/1941 | Sweden. |
| 715,295 | 9/1931 | France. |

OTHER REFERENCES

German Application K 24,930, Knür, Dec. 13, 1956.

WILBUR L. BASCOMB, JR., *Primary Examiner.*

R. A. O'LEARY, N. YUDKOFF, *Examiners.*

D. R. MATTHEWS, M. H. SILVERSTEIN,
*Assistant Examiners.*